US006455663B1

(12) United States Patent
Braat et al.

(10) Patent No.: US 6,455,663 B1
(45) Date of Patent: *Sep. 24, 2002

(54) PROCESS FOR THE MANUFACTURE OF LOW MOLECULAR WEIGHT POLYPHENYLENE ETHER RESINS THROUGH REDISTRIBUTION

(75) Inventors: Adrianus J. F. M. Braat, Roosendaal (NL); Hugo G. E. Engelbrecht, Essen (BE); Juraj Liska, Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/943,122

(22) Filed: Aug. 30, 2001

Related U.S. Application Data

(63) Continuation of application No. 09/245,253, filed on Feb. 5, 1999, now Pat. No. 6,307,010.

(51) Int. Cl.[7] .................. C08G 65/38; C08G 65/44; C08G 65/46
(52) U.S. Cl. .................. 528/217; 528/212; 528/214; 528/502 E; 528/503
(58) Field of Search .................. 528/217, 212, 528/214, 502 E, 503

(56) References Cited

U.S. PATENT DOCUMENTS

| 3,306,874 A | 2/1967 | Hay |
| 3,306,875 A | 2/1967 | Hay |
| 3,733,299 A | 5/1973 | Cooper et al. |
| 3,838,102 A | 9/1974 | Bennett et al. |
| 3,900,445 A | 8/1975 | Cooper et al. |
| 3,988,297 A | 10/1976 | Bennett et al. |
| 4,116,939 A | 9/1978 | Cooper et al. |
| 5,621,066 A | 4/1997 | Edema |
| 6,307,010 B1 * | 10/2001 | Braat et al. ......... 528/495 |

FOREIGN PATENT DOCUMENTS

| EP | 0 315 822 A1 | 10/1988 |
| WO | WO 98/36015 | 8/1998 |

OTHER PUBLICATIONS

White, D.M. "The synthesis of 4–hydroxyarylene Ethers by the Equilibration of Phenols with Poly(2,6–Dimehyl–1,1, 4–Phenylene Ether)" Journal of Organic, US, American Chemical Society, vol. 34, No. 2, 1969, pp. 297–303.

* cited by examiner

Primary Examiner—Duc Truong

(57) ABSTRACT

The invention relates to a novel process for the manufacture of functionalized polyphenylene ether resins through redistribution with a functionalized phenolic compound in the polyphenylene ether resin polymerization reaction solution without the addition of an added redistribution catalyst or promoter. The invention also relates to the functionalized polyphenylene ether resin made by the process as well as blends and articles containing the functionalized polyphenylene ether resin made by the process.

22 Claims, No Drawings

PROCESS FOR THE MANUFACTURE OF LOW MOLECULAR WEIGHT POLYPHENYLENE ETHER RESINS THROUGH REDISTRIBUTION

CROSS-REFERENCE TO RELATED APPLICATIONS

This application is a continuation and claims the benefit of the filing date of U.S. Ser. No. 09/245,253 field Feb. 5, 1999 now U.S. Pat. No. 6,307,080, the entire contents of which is hereby incorporated by reference.

FEDERALLY SPONSORED RESEARCH

Not Applicable

BACKGROUND OF THE INVENTION

1. Field of the Invention

The invention relates to a novel process for the manufacture of functionalized polyphenylene ether resins through redistribution with a functionalized phenolic compound in the polyphenylene ether resin polymerization reaction solution without the addition of an added redistribution catalyst or promoter.

The invention also relates to the functionalized polyphenylene ether resin made by the process as well as blends and articles containing the functionalized polyphenylene ether resin made by the process.

2. Brief Description of the Related Art

Polyphenylene ether resins (hereinafter "PPE") are commercially attractive materials because of their unique combination of physical, chemical, and electrical properties. Furthermore, the combination of PPE with other resins provides blends, which result in additional overall properties such as chemical resistance, high strength, and high flow.

One obstacle to blending PPE with other resins is the lack of compatibility between the resins. This lack of compatibility often manifests itself as delamination and/or poor physical properties such as, for example, poor ductility. One useful method known in the art to improve the compatibility between resins is to generate reaction products between the polymers that will act as compatibilizers for the resins. The reaction products are often thought of as copolymers of the resins.

One challenge in preparing the aforementioned reaction products is the need for reactive sites on the resins that will lead to the formation of reaction products. Some polymers such as polyamides inherently possess both amine and carboxylic acid endgroups that can readily undergo reaction with another resin containing a wide variety of possible reactive moieties. Polymers like PPE contain primarily phenolic endgroups and are in general not sufficiently reactive to result in the aforementioned reaction products in commercially feasible processes.

It should be apparent that methods and processes to introduce functionality into PPE are highly sought after. Redistribution, also known as equilibration, of phenolic compounds containing at least one functional moiety has been shown to afford PPE having desirable functionality. In the redistribution reaction of PPE with phenolic compounds, the PPE are usually split into shorter units with the phenolic compound incorporated in the PPE.

In the redistribution reactions illustrated in the art, the PPE is dissolved in a solvent with the phenolic compound and a catalyst, optionally with a promoter, is add to the reaction mixture. After heating at elevated temperatures, generally between 60° C. and 80° C., the redistributed PPE is isolated.

In order to utilize the redistribution technology in a commercially feasible manner, a process was needed that would minimize the need for additional processes, reaction vessels, and handling of PPE. It should be apparent that a process that would take advantage of the PPE polymerization process and associated mechanical equipment would be extremely advantageous.

SUMMARY OF THE INVENTION

The needs discussed above have been generally satisfied by the discovery of a process for preparing a functionalized PPE through redistribution with a phenolic compound prior to isolation of the PPE from the oxidative coupling reaction mixture and without the addition of a catalyst or a promoter. The oxidative coupling reaction conditions can be adjusted to afford sufficient in situ catalyst for the redistribution reaction.

The description that follows provides further details regarding various embodiments of the invention.

DESCRIPTION OF THE DRAWINGS

Not applicable

DETAILED DESCRIPTION OF THE INVENTION

This invention provides for a process for the preparation of low molecular weight PPE, preferably about 0.05 dl/g and 0.5 dl/g, preferably about 0.08 dl/g and 0.4 dl/g, more preferably having an intrinsic viscosity between about 0.08 dl/g and 0.16 dl/g, by oxidative coupling at least one monovalent phenol species, preferably at least a portion of which have substitution in at least the two ortho positions and hydrogen or halogen in the para position, to produce a PPE having an intrinsic viscosity of greater than about 0.16 dl/g as measured in chloroform at 25° C. using an oxygen containing gas and a complex metal-amine catalyst, preferably a copper (I)-amine catalyst, as the oxidizing agent, redistributing at least one additional phenol species to produce a PPE having an intrinsic viscosity within the range of about 0.05 dl/g and 0.5 dl/g, preferably about 0.08 dl/g and 0.4 dl/g, more preferably about 0.08 dl/g to about 0.16 dl/g, and extracting at least a portion of the metal catalyst as a metal-organic acid salt with an aqueous containing solution, and isolating the PPE through devolatilization of the reaction solvent. In one embodiment, the additional phenol species comprises a functionalized phenol species. In another embodiment, the additional phenol species is equilibrated into the PPE without additional initiator.

The PPE employed in the present invention are known polymers comprising a plurality of structural units of the formula

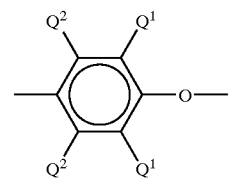

wherein each structural unit may be the same or different, and in each structural unit, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are PPE containing moieties prepared by grafting vinyl monomers or polymers such as polystyrenes and elastomers, as well as coupled PPE in which coupling agents such as low molecular weight polycarbonates, quinones, heterocycles and formals undergo reaction in known manner with the hydroxy groups of two poly (phenylene ether) chains to produce a higher molecular weight polymer, provided a substantial proportion of free OH groups remains.

The PPE are typically prepared by the oxidative coupling of at least one monohydroxyaromatic compound such as 2,6-xylenol, 2,3,6-trimethylphenol, or mixtures of the foregoing. Catalyst systems are generally employed for such coupling and they typically contain at least one heavy metal compound such as a copper, manganese, or cobalt compound, usually in combination with various other materials.

It will be apparent to those skilled in the art from the foregoing that the PPE contemplated in the present invention include all those presently known, irrespective of variations in structural units or ancillary chemical features.

The polymerization of the phenolic monomer may be carried out by adding the phenolic monomer or monomers to a suitable reaction solvent and preferably, a copper-amine catalyst. It is preferred to carry out the polymerization in the presence of a cupric salt-secondary amine catalyst such as, for example, cupric chloride and di-n-butylamine. The polymerizations are advantageously carried out in the presence of an inorganic alkali metal bromide or an alkaline earth metal bromide. The inorganic bromides may be used at a level of from about 0.1 mole to about 150 moles per 100 moles of phenolic monomer. These catalyst materials are described in U.S. Pat. No. 3,733,299 (Cooper et al.). Tetraalkylammonium salts may also be employed as promoters if desired. These promoters are disclosed in U.S. Pat. No. 3,988,297 (Bennett et al.).

The primary, secondary or tertiary amine components of the catalyst complex generally correspond to those disclosed in U.S. Pat. Nos. 3,306,874 and 3,306,875 (Hay). Illustrative members include aliphatic amines, including aliphatic mono- and di-amines, where the aliphatic group can be straight or branched chain hydrocarbon or cycloaliphatic. Preferred are aliphatic primary, secondary and tertiary monoamines and tertiary diamines. Especially preferred are mono-, di- and tri(lower) alkyl amines, the alkyl groups having from 1 to 6 carbon atoms. Typically, there can be used mono-, di- and tri-methyl, ethyl, n-propyl i-propyl, n-butyl substituted amines, mono- and di-cyclohexylamine, ethylmethyl amine, morpholine, N-(lower) alkyl cycloaliphatic amines, such as N-methylcyclohexylamine, N,N'-dialkylethylenediamines, the N,N'-dialkylpropanediamines, the N,N,N,'-trialkylpentanediamines, and the like. In addition, cyclic tertiary amines, such as pyridine, alpha-collidine, gamma picoline, and the like, can be used. Especially useful are N,N,N',N'-tetraalkylethylenediamines, butane-diamines, and the like.

Mixtures of such primary, secondary and tertiary amines may be used. A preferred mono alkyl amine is n-butyl amine; a preferred dialkyl amine is di-n-butyl amine; and a preferred trialkyl amine is triethylamine. A preferred cyclic tertiary amine is pyridine. The concentration of primary and secondary amine in the reaction mixture may vary within wide limits, but is desirably added in low concentrations. A preferred range of non-tertiary amines comprises from about 2.0 to about 25.0 moles per 100 moles of monovalent phenol. In the case of a tertiary amine, the preferred range is considerably broader, and comprises from about 0.2 to about 1500 moles per 100 moles of monovalent phenol. With tertiary amines, if water is not removed from the reaction mixture, it is preferred to use from about 500 to about 1500 moles of amine per 100 moles of phenol. If water is removed from the reaction, then only about 10 moles of tertiary amine, e.g., triethylamine or triethylamine, per 100 moles of phenol need be used as a lower limit. Even smaller amounts of tertiary diamines, such as N,N,N'N'-tetramethylbutanediamine can be used, down to as low as about 0.2 mole per 100 moles of phenol.

Typical examples of cuprous salts and cupric salts suitable for the process are shown in the Hay patents. These salts include, for example, cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts include the halides, alkanoates or sulfates, e.g., cuprous bromide and cuprous chloride, cupric bromide and cupric chloride, cupric sulfate, cupric fluoride, cuprous acetate and cupric acetate. With primary and secondary amines, the concentration of the copper salts is desirable maintained low and preferably varies from about 0.2 to 2.5 moles per 100 moles of monovalent phenol. With tertiary amines, the copper salt is preferable used in an amount providing from about 0.2 to about 15 moles per 100 moles of the monovalent phenol.

Cupric halides are generally preferred over cuprous halides for the preparation of the copper amine catalyst because of their lower cost. The use of the copper (I) species also greatly increases the rate of oxygen utilization in the early stages of the polymerization reaction and the lower oxygen concentration in the head space of the reactor helps in reducing the risk of fire or explosion in the reactor. A process for the preparation and use of suitable copper-amine catalysts is in U.S. Pat. No. 3,900,445 (Cooper et al.).

In the practice of the invention, the catalyst (also known as an initiator) for the redistribution reaction is preferably generated in situ during the oxidative coupling process. Backward dimer, tetramethyldiphenylquinone (TMDQ), is normally made during coupling of 2,6-dimethylphenol and is a preferred catalyst. Other diphenylquinones may also be present depending on the phenolic species being oxidatively coupled.

Reaction conditions that favor generation of the backward dimer are preferred and can be readily controlled. When the level of monomer is increased during the early stages of oxidation, higher levels of TMDQ are produced. Likewise, a slower initial reaction rate with the copper (I) based catalyst also results in an increased accumulation of unreacted monomer and an increase in the amount of TMDQ produced. The copper amine ratio affects the amount of TMDQ generated with a higher ratio of amine to copper favoring an increase in the amount of TMDQ. Additionally, allowing the reaction mixture to heat, preferably from the reaction exotherm, also results in higher levels of TMDQ. Generally, the reaction mixture is maintained between about 30° and 45° C., however allowing the temperature to increase to even 50° C. results in an increase in the level of TMDQ. Preferably the level of catalyst is less than 10% by weight with respect to the PPE.

Numerous studies conducted to determine conditions that can lead to increased levels of backward dimer (e.g., TMDQ) during the oxidative coupling process have resulted in a number of other unexpected factors that affect the formation of backward dimer. First, increasing the ratio of phenolic monomer to solvent (e.g., 2,6-xylenol:toluene ratio) leads to higher backward dimer ratios as does a high addition rate of phenolic monomer to the reaction mixture. As previously discussed, increases in the reactor temperature also leads to increased levels of backward dimer. Finally, running the oxidative coupling at a lower percentage of oxygen in the reactor (i.e. a lower phenolic to oxygen ratio) also leads to increased amounts of backward dimer.

If no additional functionalized phenolic compound is added at the equilibration step of the process, the TMDQ (or any other backward dimer) becomes incorporated into the PPE and can lead to a high hydroxyl PPE. It should be clear that the present invention also includes processes to increase the hydroxyl level on PPE by increasing the level of backward dimer (e.g., TMDQ) during the oxidative coupling process and incorporating at least a portion of the TMDQ through redistribution (i.e. equilibration). For example, a PPE oxidative coupling reaction that has a TMDQ level of about six weight percent based on the weight of the PPE at the end of reaction had a hydroxyl number of about 360 $\mu$mol/g after equilibration.

The polymerization reaction is preferably performed in a solvent. Suitable solvents are disclosed in the above-noted Hay patents. Aromatic solvents such as benzene, toluene, ethylbenzene, xylene, and o-dichlorobenzene are especially preferred, although tetrachloromethane, trichloromethane, dichloromethane, 1,2-dichloroethane and trichloroethylene may also be used. The weight ratio between solvent and monomer is normally in the range from 1:1 to 20:1, i.e., up to a maximum 20-fold excess of solvent. The ratio between solvent and monomer is preferably in the range from 1:1 to 10:1 by weight.

The temperature to carry out the polymerization stage of the invention generally ranges from about 0° C. to about 95° C. More preferably, the temperature range is from about 35° C. to about 55° C. with the higher reaction temperature near the end of reaction. At substantially higher temperatures, side reactions can occur leading to undesirable reaction by-products and at temperatures substantially lower, ice crystals form in the solution. As previously discussed, allowing the reaction mixture to increase above about 50° C. results in an increase in the level of backward dimer produced that can be used to catalyze the redistribution reaction.

The process and reaction conditions for the polymerization, such as reaction time, temperature, oxygen flow rate and the like are modified based on the exact target molecular weight desired. The endpoint of the polymerization is conveniently determined with an in-line viscosity meter. Although other methods such as making molecular weight measurements, running to a predetermined reaction time, controlling to a specified endgroup concentration, or the oxygen concentration in solution may also be utilized.

After the end of the oxidative coupling reaction as determined by the desired molecular weight of the PPE, at least one phenolic compound is added to the reaction mixture and allowed to circulate while maintaining the temperature preferably between about 20° and about 150° C., preferably between about 60° and 80° C. The reaction mixture is maintained at temperature for about 30 to about 90 minutes, although longer times are possible. During this redistribution step, the flow of oxygen has been preferably halted as the oxidative coupling has been completed. Generally, higher redistribution conversions are obtained under air as opposed to nitrogen.

In the process of the invention, the functionalized phenolic compound is chosen from the following:

A) phenolic compounds with formula

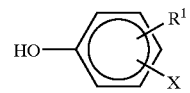

wherein $R^1$ represents a hydrogen-atom or an alkyl group and X represents an allyl group, an amino group, a protected amino group (e.g., protected by a tertiary-butyl carbonate), a carboxyl group, a hydroxy group, an ester group or a thiol group, wherein $R^1$ is an alkyl group when X represents an hydroxy group or an ester group, wherein X may be separated from the phenol ring through an alkyl group and wherein the total number of carbon atoms in the alkyl groups attached to the phenol ring is not more than six;

B) bisphenol compounds with formula

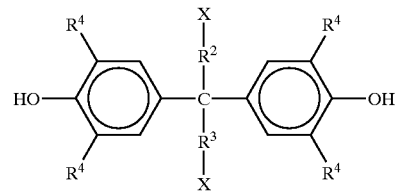

wherein each X, independently of the other X represents a hydrogen atom, an allyl group, an amino group, a protected amino group (e.g., protected by a tertiary-butyl carbonate), a carboxyl group, a hydroxy group, an ester group or a thiol group, with the proviso that not more than one X group represents a hydrogen atom, $R^2$ and $R^3$ represent an hydrogen atom or an alkyl group with 1–6 carbon atoms and each $R^4$ represents independently of the other $R^4$ a hydrogen atom, a methyl group or an ethyl group;

C) a phenolic compound with at least one of the formulas:

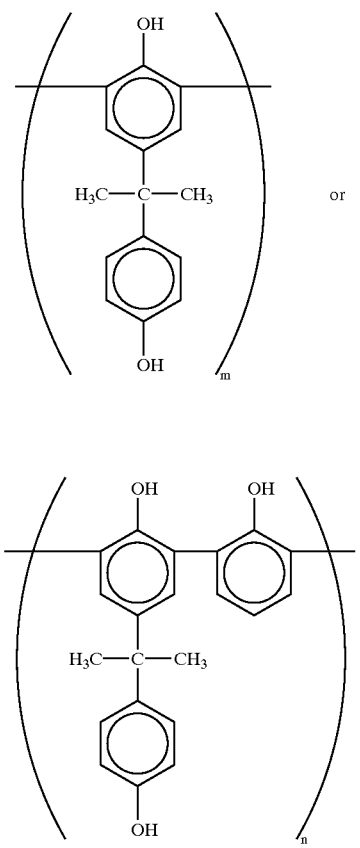

wherein m and n have values from 2–20;

D) phenolic compounds with formula

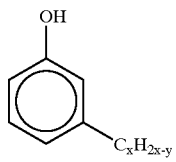

wherein x has a value of 12–20 and y has a value of 1–7 or a derivative thereof;

E) multifunctional phenolic compounds with formula

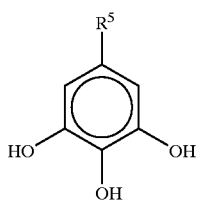

wherein $R^5$ represents a hydrogen atom, an alkyl group, an allyl group, an amino group, a protected amino group (e.g., protected by a tert-butyl carbonate), a carboxyl group, a hydroxy group, an ester group or a thiol group; or F) phenolic compounds with amino groups with formula

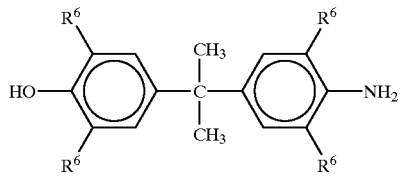

wherein $R^6$ represents independently of one another a hydrogen atom, an alkyl group or a methylene phenol group.

At the end of the redistribution, the functionalized PPE has a lower intrinsic viscosity, and hence a lower molecular weight, than does the PPE at the end of the oxidative coupling reaction. The degree of the decrease is determined at least in part by the amount of phenolic compound utilized and the amount of catalyst, e.g., TMDQ, present. In a preferred embodiment, the functionalized PPE has a weight average molecular weight of at least 1000, preferably between about 3000 and about 70,000 as compared to polystyrene standards. In another preferred embodiment, the functionalized PPE has an intrinsic viscosity of between about 0.05 dl/g and 0.50 dl/g, preferably between about 0.08 dl/g and 0.30 dl/g as measured in chloroform at 30° C. The PPE may have a bi-modal distribution of molecular weights.

Preferably after completion of the redistribution reaction, the complex catalyst is chelated to convert the catalyst into a water soluble metal complex. It is also possible to add the chelating agent with the phenolic compound or even before the phenolic compound. In either case, it is preferable to add the phenolic compound within a short time frame after the oxygen flow has been discontinued as the TMDQ will begin redistributing and can become consumed before serving as a catalyst for the phenolic compound.

Many diverse extractants or chelating agents may be used in the practice of the invention to complex with the catalyst. For example, sulfuric acid, acetic acid, ammonium salts, bisulfate salts and various chelating agents may be used. When these materials are added to a PPE reaction solution, the copper-amine catalyst becomes poisoned and further oxidation does not take place. Many different materials may be used but it is preferred to employ those chelating agents that are disclosed in U.S. Pat. No. 3,838,102 (Bennett et al.).

The useful chelating agents include polyfunctional carboxylic acid containing compounds such as, for example, sodium potassium tartrate, nitrilotriacetic acid (NTA), citric acid, glycine and especially preferably they will be selected from polyalkylenepolyamine polycarboxylic acids, aminopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts. The preferred agents include ethylenediaminetetraacetic acid (EDTA), hydroxyethylenediaminetriacetic acid, diethylenetriaminepentaacetic acid and their salts. Especially preferred are ethylenediaminotetraacetic acid or a mono-, di-, tri- and tetrasodium salt thereof and the resulting copper complex can be referred to as a copper carboxylate complex.

The chelated metallic catalyst component can be extracted with the water produced in the polymerization reaction by through the use of a liquid/liquid centrifuge. The preferred extraction liquid for use in the process of the invention is an aqueous solution of lower alkanol, i.e., a mixture of water and an alkanol having from 1 to about 4 carbon atoms. Generally from about 1% to about 80% by volume of an alkanol or glycol may be employed. These ratios may vary from about 0.01:1 to about 10:1 parts by volume of aqueous liquid extractant to discrete organic phase.

The reaction media generally comprises an aqueous environment. Anti-solvents can also be utilized in combination with the aqueous media to help drive the precipitation of the copper (I) species. The selection of an appropriate anti-solvent is based partially on the solubility co-efficient of the copper (I) species that is being precipitated. The halides are highly insoluble in water, log $K_{[sp]}$ values at 25° C. are —4.49, —8.23 and —11.96 for CuCl, CuBr and CuI, respectively. Solubility in water is increased by the presence of excess of halide ions due to the formation of, e.g., $CuCl_2$, $CuCl_3$, and $CuCl_4$ and by other complexing species. Non-limiting examples of anti-solvents would comprise low molecular weight alkyl and aromatic hydrocarbons, ketones, alcohols and the like which in themselves would have some solubility in the aqueous solution. One skilled in the art would be able to select an appropriate type and amount of anti-solvent, if any was utilized.

After removal of the catalyst, the PPE containing solution is concentrated to a higher solids level as part of the isolation of the PPE. Precipitation using standard non-solvent techniques typical for PPE having I.V.'s greater than 0.28 dl/g are not generally useful for isolation of low molecular weight PPE due to the small PPE particle size and friability of the particles. Very low yields are obtained with undesirable fractionation of oligomeric species. A total isolation process is preferred for isolating the PPE. As part of the total isolation, a portion of the solvent is preferably removed in order to reduce the solvent load on the total isolation equipment.

Concentration of the PPE containing solution is accomplished by reducing the pressure in a solvent flash vessel while preferably increasing the temperature of the PPE containing solution. Pressures of about 35 to 50 bar are desirable with solution temperatures increased to at least 200° C., preferably of at least 230° C. A solids level of PPE of at least 55%, preferably of at least 65% or higher is desirable.

The isolation of the PPE is typically carried out in a devolatilizing extruder although other methods involving spray drying, wiped film evaporators, flake evaporators, and flash vessels with melt pumps, including various combinations involving these methods are also useful and in some instances preferred. As previously described, total isolation is preferably from the viewpoint that oligomeric species are not removed to the same degree as with precipitation. Likewise, isolation yields are extremely high and are near quantitative. These techniques require however that the catalyst removal be completed in the prior process steps, as any catalyst remaining in solution will necessarily be isolated in the PPE.

Devolatilizing extruders and processes are known in the art and typically involve a twin-screw extruder equipped with multiple venting sections for solvent removal. In the practice of the present invention, the preheated concentrated solution containing the PPE is fed into the devolatilizing extruder and maintained at a temperature less than about 275° C., and preferably less than about 250° C., and most preferably between about 185–220° C. with pressures in the vacuum vent of less than about 1 bar. The resultant solvent level is reduced to less than about 1200 ppm, preferably less than about 600 ppm, and most preferably less than about 400 ppm.

When using a devolatilization extruder for the total isolation of the PPE, it was found that traditional underwater or water spray cooling of strands of extrudate followed by chopping the extrudate into pellets gave unacceptable results presumably due to the low melt strength and inherent brittle nature of low molecular weight PPE. It was found that special pelletization techniques could overcome these difficulties. Useful techniques include die-face pelletization, including underwater pelletization and flaking, declining angle strand pelletization using water spraying, and vibration drop pelletization with underwater pelletization especially suitable.

It was unexpectedly found that underwater pelletization resulted in a significantly lower color in the PPE as compared to the standard stranding with water/air cooling followed by pelletization techniques. Yellowness index (YI) numbers of less than 30, and even less than 25 are achievable as compared to YI>50 achieved with the standard stranding technique. It should be apparent that the present process affords a method of preparing a PPE with a YI of less than about 30, preferably less than about 25.

The collected PPE pellets can be dried using techniques standard in the art including centrifugal dryers, batch or continuous oven dryers, fluid beds, and the like. Determination of an appropriate set of conditions can be readily determined by one of skill in the art without undue experimentation.

One unexpected advantage of the present invention to make functionalized PPE is using the inherent backward dimer produced in situ by the oxidative coupling reaction to catalyze the redistribution reaction during the polymerization reaction process without a prior isolation of the PPE. This process has advantages for cost reduction simply by reducing the number of handling steps involved. Moreover, the PPE is subject to fewer heat treatments than isolating the PPE followed by re-dissolving the PPE into a suitable solvent for redistribution. The process also affords a method to make a low molecular weight (i.e. PPE with an intrinsic viscosity between about 0.08 dl/g and about 0.16 dl/g) functionalized PPE.

All patents cited by reference are incorporated herein by reference.

In order that those skilled in the art will be better able to practice the invention, the following examples are given by way of illustration and not by way of limitation.

EXAMPLES

Standard PPE Polymerization Procedure

The catalyst solution can be prepared by stirring 0.41 g of cuprous bromide and 10.9 g of di-n-butyl amine in 100 ml of toluene. The catalyst is transferred to a one liter stirred glass reactor equipped with an internal cooling coil and inlet tubes for oxygen and monomer. A rapid stream of oxygen is introduced near the bottom of the reactor and a solution of 70 g of 2,6-xylenol in 100 ml of toluene is added through a metering pump, over a period of fifteen minutes, to the rapidly stirred solution. The temperature is maintained at about 30° C. by circulating water from a constant temperature bath through the cooling coil. At about 60, about 90 and about 120 minutes after the beginning of monomer addition, samples of the reaction mixture are withdrawn, stirred with a small amount of 50% aqueous acetic acid, centrifuged, and the polymer solution is decanted. The polymer can be precipitated by addition of methanol, filtered washed with methanol, and dried under vacuum. Intrinsic viscosities are measured in chloroform solution at 30° C. and are typically measured as 0.29, 0.48, and 0.57 dl/g respectively for the 60, 90, and 120 minutes reaction aliquots.

Example 1

Preparation of Functionalized PPE Resin Directly During PPE Synthesis

PPE polymerization was performed according to the standard procedure using 2,6-xylenol, copper/amine complex, toluene and oxygen. In this example was added 1.48 weight percent of 4,4'-bis(4-hydroxy-3,5-dimethylphenyl)pentanoic acid (BX-COOH) per 2,6-xylenol at the beginning of the reaction. As the results show (see the Table below), BX-COOH acts as chain stopper and low molecular weight functionalized PPE is prepared. Attempts to prolong the reaction (up to 5.5 hours) did not result in any significant increase in molecular weight.

Example 2

Preparation of Functionalized PPE Resin Directly During PPE Synthesis

The procedure was repeated according to the Example 1, only BX-COOH was added with last portion of 2,6-xylenol that was continuously added over first 40 min of the oxidative coupling reaction. As with Example 1, BX-COOH was a chain stopper and only very low molecular PPE could be obtained.

Example 3

Preparation of Functionalized PPE Immediately After Oxidative Coupling

The standard PPE preparation has been done according to the Example 1, except that BX-COOH was added immediately after oxidative coupling (PPE synthesis) was stopped.

All the products were isolated via standard catalyst removal step, solvent evaporated and the unreacted BX-COOH was removed by Soxhlet extraction with methanol (15 hours). The products were vacuum dried at 90° C. overnight and characterized.

The characteristics of all the products are presented in the table below.

| Phenol der. | Mw, g/mol | Mn, g/mol | Tg, C | Phenol incorporation % |
| --- | --- | --- | --- | --- |
| Ex 1 | 4000 | 3400 | 146 | 54 |
| Ex 2 | 3700 | 3200 | 140 | 86 |
| Ex 3 | 22900 | 11400 | 203 | 94 |

The above examples illustrate that functionalized PPE may be prepared by the process as described herein utilizing the TMDQ generated in situ during the oxidative coupling reaction without addition of additional catalyst.

What is claimed:

1. A process to produce a functionalized polyphenylene ether resin, said process comprising:
    i. oxidative coupling in a reaction solution at least one monovalent phenol species using an oxygen containing gas and a complex metal catalyst to produce a polyphenylene ether resin and a redistribution catalyst,
    ii. redistributing a functionalized phenolic compound into the polyphenylene ether resin in the reaction solution of step i to form a functionalized polyphenylene ether resin, and
    iii. isolating the functionalized polyphenylene ether resin.

2. The process of claim 1 wherein the redistribution catalyst comprises a dimer of the monovalent phenol species.

3. The process of claim 1 wherein the redistribution catalyst comprises a diphenylquinone.

4. The process of claim 1 wherein the oxidative coupling is done between about 35° C. and about 55° C.

5. The process of claim 1 wherein the reaction solution in step i is allowed to reach a temperature above about 50° C.

6. The process of claim 1 wherein the redistribution of step ii is done at a temperature between about 20° C. and about 150° C.

7. The process of claim 1 wherein the redistribution of step ii is done at a temperature between about 60° C. and about 80° C.

8. The process of claim 1 wherein the functionalized polyphenylene ether resin has an intrinsic viscosity between about 0.05 dl/g and about 0.50 dl/g as measured in chloroform at 30° C.

9. The process of claim 1 wherein the functionalized polyphenylene ether resin has an intrinsic viscosity between about 0.08 dl/g and about 0.30 dl/g as measured in chloroform at 30° C.

10. The process of claim 1 wherein the functionalized polyphenylene ether resin has a weight average molecular weight between about 3000 and 70,000.

11. The process of claim 1 wherein the functionalized polyphenylene ether resin has a bi-modal distribution of molecular weights.

12. The process of claim 1 further comprising removal of the complex metal catalyst prior to step iii.

13. The process of claim 1 further comprising the step of converting the complex metal catalyst into a water soluble metal complex.

14. The process of claim 1 wherein step iii comprises precipitating the functionalized polyphenylene ether resin.

15. The process of claim 1 wherein step iii comprises a total isolation process.

16. The process of claim 1 wherein step iii comprises isolating the functionalized polyphenylene ether resin at least in part by devolatilization.

17. The process of claim 1 wherein step iii comprises at least one of spray drying, wiped film evaporating, and flake evaporating.

18. The process of claim 1 wherein step ii occurs prior to isolation of the polyphenylene ether resin of step i.

19. The process of claim 1 wherein the functionalized phenolic compound is at least one compound selected from the group consisting of:

A) phenolic compounds with formula

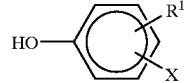

wherein $R^1$ represents a hydrogen-atom or an alkyl group and X represents an allyl group, an amino group, a protected amino group, a carboxyl group, a hydroxy group, an ester group or a thiol group, wherein $R^1$ is an alkyl group when X represents an hydroxy group or an ester group, wherein X may be separated from the phenol ring through an alkyl group and wherein the total number of carbon atoms in the alkyl groups attached to the phenol ring is not more than six;

B) bisphenol compounds with formula

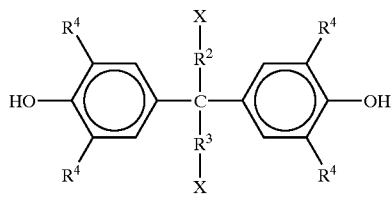

wherein each X, independently of the other X represents a hydrogen atom, an allyl group, an amino group, a protected amino group, a carboxyl group, a hydroxy group, an ester group or a thiol group, with the proviso that not more than one X group represents a hydrogen atom, $R^2$ and $R^3$ represent an hydrogen atom or an alkyl group with 1–6 carbon atoms and each $R^4$ represents independently of the other $R^4$ a hydrogen atom, a methyl group or an ethyl group;

C) a phenolic compound with at least one of the formulas:

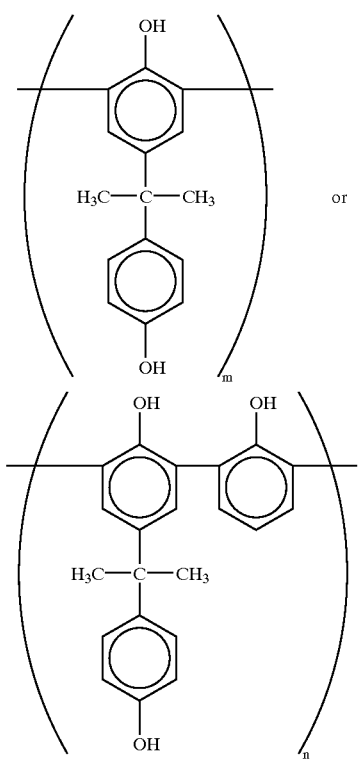

wherein m and n have values from 2–20;

D) phenolic compounds with formula

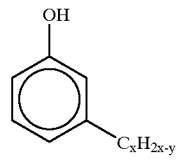

wherein x has a value of 12–20 and y has a value of 1–7 or a derivative thereof;

E) multifunctional phenolic compounds with formula

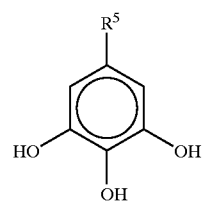

wherein $R^5$ represents a hydrogen atom, an alkyl group, an allyl group, an amino group, a protected amino group, a carboxyl group, a hydroxy group, an ester group or a thiol group; or F) phenolic compounds with amino groups with formula

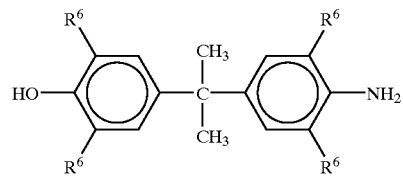

wherein $R^6$ represents independently of one another a hydrogen atom, an alkyl group or a methylene phenol group.

20. The process of claim 1 wherein the phenolic compound is 4,4'-(bis(4-hydroxyphenyl)pentanoic acid or derivative of the acid.

21. The functionalized polyphenylene ether made by the process of claim 1.

22. The process of claim 1 wherein the functionalized polyphenylene ether resin has a Yellowness index of less than 30.

* * * * *